United States Patent [19]

Beusen

[11] Patent Number: 5,042,998
[45] Date of Patent: Aug. 27, 1991

[54] DEVICE FOR TREATING OR MIXING COMPONENTS IN GAS OR LIQUID STREAMS

[76] Inventor: Gerardus L. Beusen, Van Twillerstraat 25, 3862 AT Nijkerk, Netherlands

[21] Appl. No.: 581,197
[22] Filed: Sep. 11, 1990

Related U.S. Application Data

[63] Continuation of Ser. No. 307,279, Feb. 7, 1989, abandoned.

[51] Int. Cl.$^5$ .............................................. B01D 45/12
[52] U.S. Cl. ....................................... 55/338; 55/459.1
[58] Field of Search ...................... 55/1, 338, 394, 396, 55/397, 413, 459.1; 209/144

[56] References Cited

U.S. PATENT DOCUMENTS

| | | | |
|---|---|---|---|
| 432,350 | 7/1890 | Wolf | 55/397 |
| 1,960,887 | 5/1934 | Alexander | 55/459.1 |
| 2,585,440 | 2/1952 | Collins | 55/235 |
| 3,912,469 | 10/1975 | Ewan et al. | 55/238 |

Primary Examiner—Bernard Nozick
Attorney, Agent, or Firm—Fleit, Jacobson, Cohn, Price, Holman & Stern

[57] ABSTRACT

The present invention relates to a method and apparatus for removing contaminants from gas or liquid streams, such as contaminated flue gases of refuse incinerators. The method comprises contacting a contaminated gas or liquid with neutralizing and/or absorbing substances in a whirling mixture, wherein the whirling motion is accelerated with simultaneous compression of the mixture; expansion of the compressed, whirling mixture; acceleration and compression of the expanded whirling mixture; and subsequent deceleration of the whirling mixture with removal of reaction products containing the contaminants and neutralizing and/or absorbing substances. The apparatus comprises a cylindrical chamber for contacting the contaminated gas or liquid stream with neutralizing and/or absorbing substances, and contains at least one assembly of conical inserts that cause the acceleration with simultaneous compression of the whirling mixture; expansion and subsequent re-acceleration with compression; and deceleration of the whirling mixture with removal of reaction products.

4 Claims, 5 Drawing Sheets

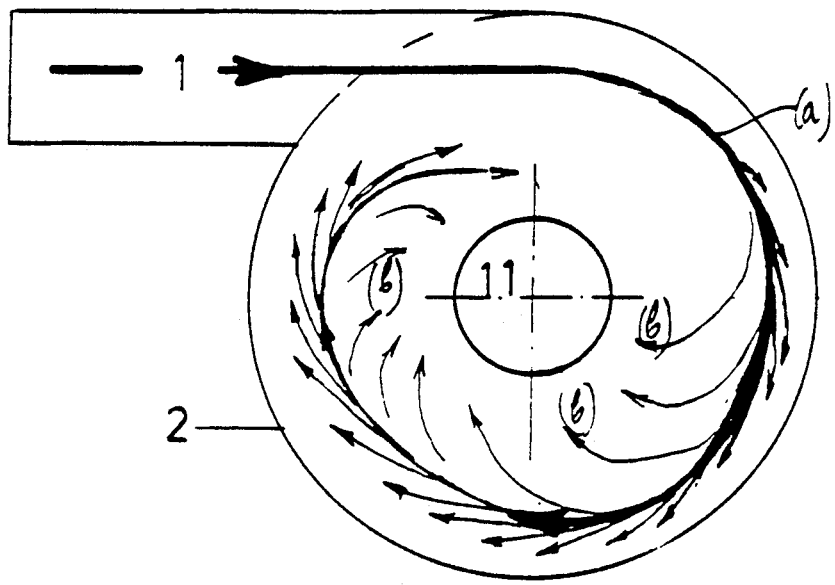
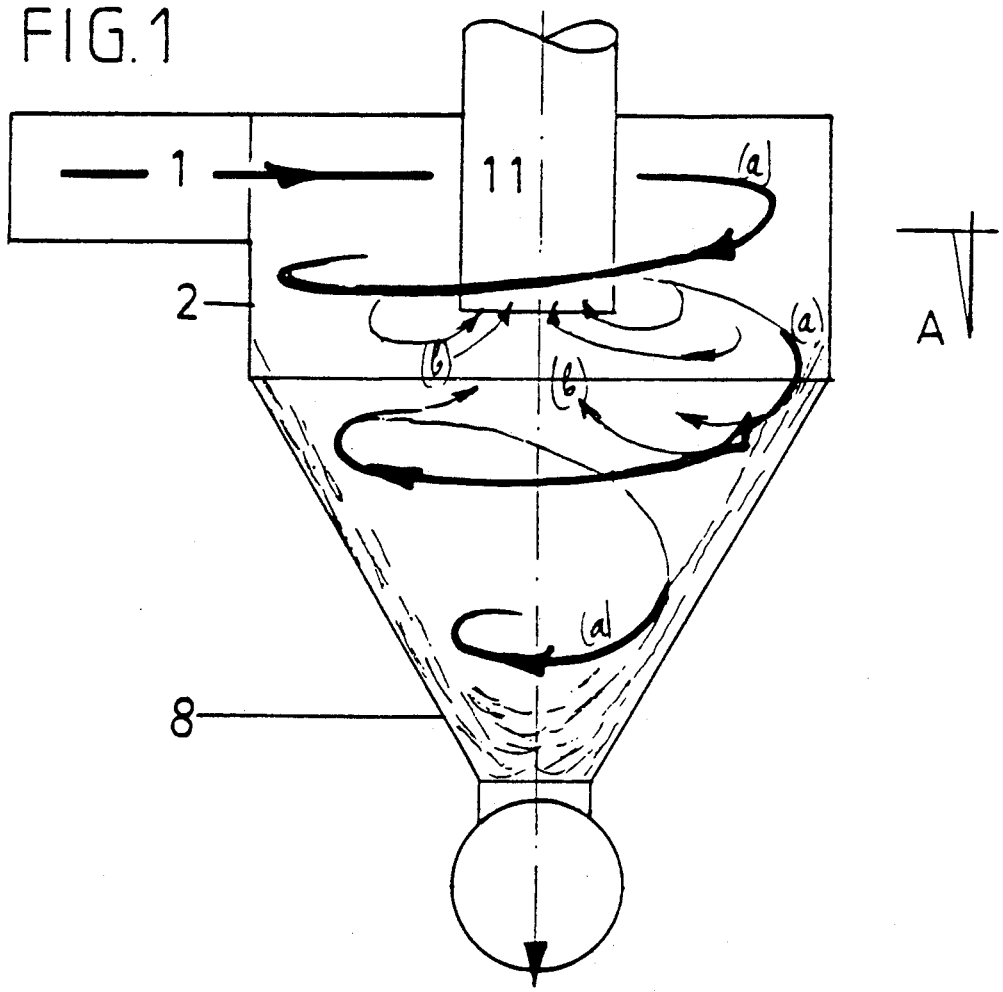

DEVICE FOR TREATING OR MIXING COMPONENTS IN GAS OR LIQUID STREAMS

This application is a continuation of application Ser. No. 07/307,279, filed Feb. 7, 1989, now abandoned.

This invention relates to a method of removing, possibly by chemical binding, contaminants in a fluid, such as a gas or liquid stream, in which the fluid is contacted with neutralizing and/or absorbing substances and the resulting mixing or reaction products are separated.

One example of an appliance wherein this method is performed is the cyclone-shaped reaction chamber(s) wherein absorption/neutralizing substances are contacted with contaminated flue gases of refuse incinerators.

In these, the cyclones' first function is the capture of sparks entrained from the incinerators in those cases wherein cloth filters are used to remove fly ash and reaction products from the flue gases, before said flue gases are discharged into the atmosphere through a chimney stack. The contact between the flue gases and the absorption/neutralizing substances added thereto in the cyclones is such that a part of the acid components from the flue gases are bonded and neutralized. Tests have shown that the neutralizing effect inside the cyclones is higher than that of the neutralizing layer formed on the downstream filter cloths. Yet there is evidence that, in the case of heavy loads with acid components as regularly occurring in practice in flue gases, the total efficiency of upstream cyclones and downstream cloth filters, is insufficient to meet the emission standards recently laid down in national and international regulations.

The alternative option would be for wet flue gas cleaning, with which these standards can be met. The consequence of that, however, is that it will increase investments by a factor of 2 or 3 as a result of the elaborate processing involved in this method, on top of which, in most cases, additional waste water purification is required.

It is an object of the present invention to improve the dry flue gas purification with cyclones in such a manner that emission standards are met and expected by even lower values will result, thus achieving a particular improvement in the solution of environmental problems in respect of, for example, refuse incinerators. This can be realized at quite acceptable prices at that.

To that effect, according to the present invention, by application of the features recited in the characterizing clause of claim 1, the components entering the cyclone are not only centrifuged but the light fractions in the flue gases, including the major part of the gaseous acid components, are prevented from diffusing directly through the flue gas stream to the cyclone exit, so that the contact with the neutralizing heavier components is too short.

According to the present invention, the light fractions in the flue gases, together with the heavier fractions are jointly centrifuged after entering the cyclones, while in contrast to the situation in the present design within cyclones, increasingly intensive contact is enforced by increased concentration and at the same time strongly increased velocity by means of an inverted cone provided preferably in the center of the cyclone. This forces the light (i.e. the acid) components in the flue gases to react with the neutralizing substances immediately, intensively and for a prolonged period of time.

By repeating the inverted cone construction, as indicated above, at a lower level, there is obtained a reversal of the flue gas motion, whereby the descending high-velocity whirl is converted into a rising initially expanding whirl of relatively low velocity. According as the whirl thereafter at higher level again approaches the center of the cyclone, the acceleration and the concentration are considerably increased. The heavier fractions in the strongly accelerated rising whirl are again mixed intensively with the light fractions (including those to be neutralized) in the gas stream. Repetition of the above inverted cone constructions in the interior of the cyclone will increase the effect of mixing and neutralizing acid components in the flue gases. Moreover, the effect of mixing and chemical reaction can be increased per "floor" by rendering the distance between the internal cones adjustable. In this manner, substantially higher vortex speeds (and hence higher mixing efficiency) can be achieved than provided initially (i.e. upon entry into the cyclone). The variation of the distance between the internal cones can be controlled by coupling the adjustment to e.g. the measured acidity of the flue gases prior to their discharge to the chimney stack. The last fixed cone can be extended to a cylindrical bin where the vortex can be reduced to such a low velocity — by properly dimensioning the cylinder — that solid components (fly ash, chemical reaction products and possible excess of neutralizing substances) are separated. The purified gas stream is removed through a central exhaust within the lowest cylinder. Naturally, exhaust from the installation need not necessarily take place in the above manner. It is also possible for instance to select tangential exhaust from the circumference. Another possibility could be: exhaust from the top of the device in the case where one "floor" would be sufficient to attain the required efficiency. If an enlargement of the lowest cone is selected, as mentioned above, there is automatically produced a collecting bin which can selectively perform a number of useful functions:

a) temporary storage of separated and/or reacted products prior to discharge into a container;

b) return of the separated products to the inlet of the cyclone or one of the floors, to thereby allow any neutralizing material not yet entirely reacted to participate again in the process. Some embodiments of apparatus according to the present invention will now be described, by way of example, with reference to the accompanying drawings, in which:

FIG. 1 diagrammatically shows the operation of a conventional cyclone;

FIG. 1A is a cross-sectional view according to the arrow A in FIG. 1;

FIG. 1 is a cross-sectional view of a conventional cyclone construction, showing the centrifugal separation of heavier fly ash, neutralizing substances and reaction products via the descending vortex (a) and the rapid diffusion of the light (e.g. acid) components (b), including light solid components of the flue gases, which are subsequently discharged to filters upstream of the chimney stack. The flue gases mixed with absorbing and/or neutralizing substances are introduced tangentially through 1 into the cylindrical portion 2 where they are contacted with each other. The heavier components, such as fly ash and a part of the reaction material, descend via vortex (a) into the discharge or collecting hopper 8. The lighter fractions, such as acid gases, light fly ash particles and residual reaction material, are separated from vortex (a) directly at the open bottom of exhaust pipe 11 and disappear through vortex (b) in fractions of seconds through pipe 11. The reaction time available for neutralizing undesirable components is therefore very short. In those cases where the percentage of undesirable chemical components in the gas stream is high, the added neutralizing and/or absorption agent will react insufficiently. Thus the composition of the flue gases discharged via 11 will fail to meet the recently raised emission standards.

A substantial excess of neutralizing agent has proved unable to solve the problem and moreover creates two additional problems:

the extra cost connected with the discharge of substantial amounts of residues to dumping sites which can accept these materials only at increased rates.

The residues, in fact, require additional provisions at the dumping sites to control the water economy and quality.

It is an object of the present invention to avoid these drawbacks and to positively improve the result in a manner as shown in principle in FIGS. 2-7.

Figure 2:
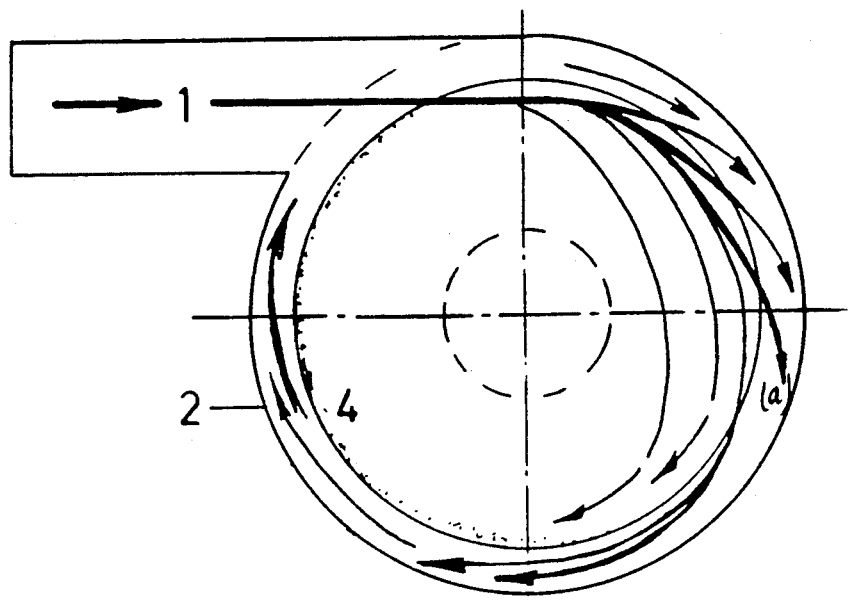
FIG. 2 shows in top plane view the operation of a cyclone according to the present invention.
Figure 3:
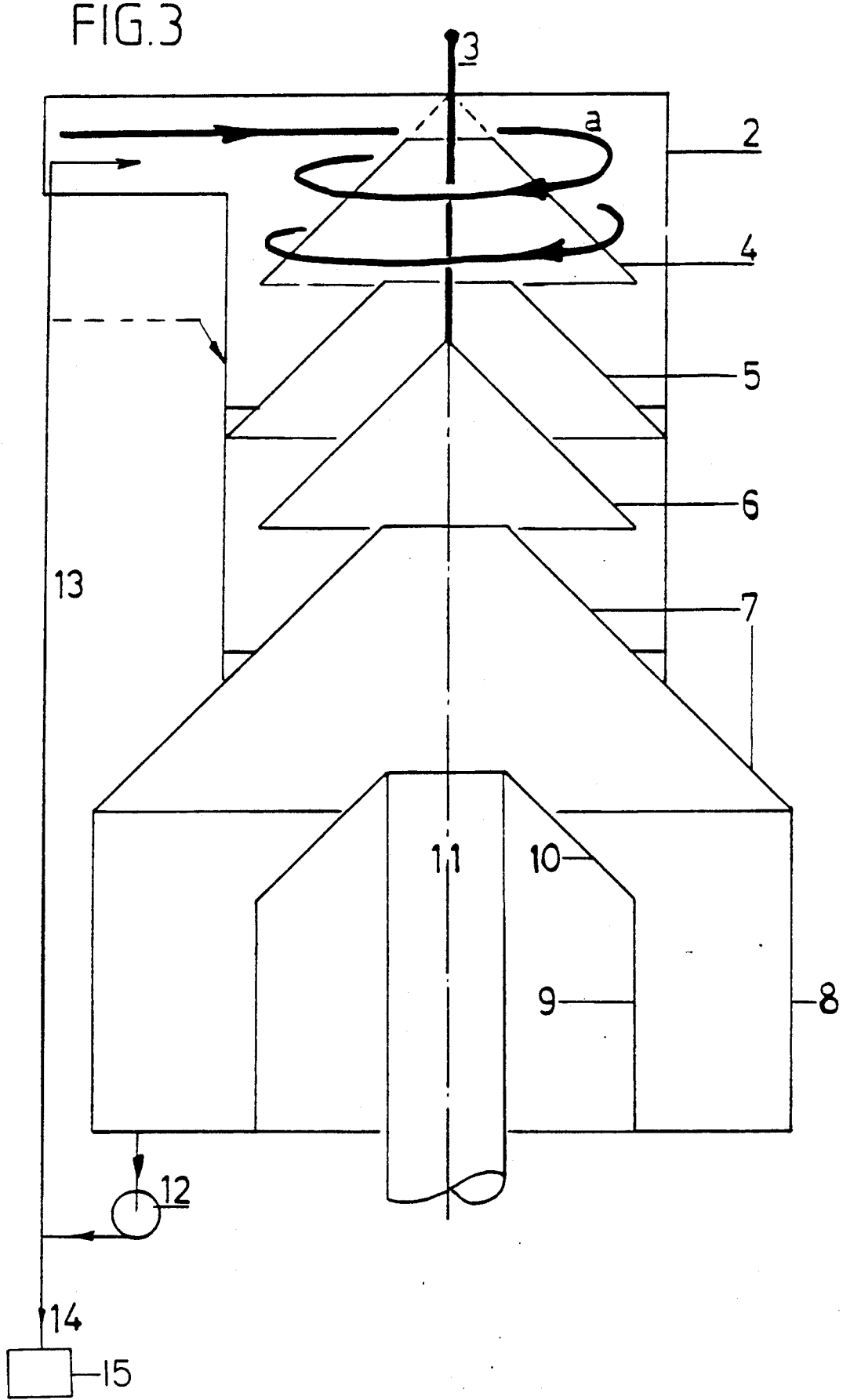
FIG. 3 is a diagrammatic cross-sectional view of the cyclone shown in FIG. 2.

As shown in FIGS. 2 and 3, flue gases are introduced tangentially through 1 into the cylinder 2 — the cyclone — possibly with added neutralizing substances. The additions of these and/or other substances, naturally, can also take place after the entry, e.g. through the apex of cone 4 or the base of cone 5.

Also as illustrated in FIG. 3, the mixture of the fluids and substances or the reaction product are delivered to a container 12 which may go to the recirculation pipe 13 and/or to pipe 14 to a downstream filtering device 15.

Undesirable components, together with the heavier components (fly ash and neutralizing substances) are centrifuged in cylinder 2, while in contrast to the situation described for the cyclones of the prior art, increasingly intensive contact is promoted by increased concentration and at the same time strongly increase velocity of vortex (a) by means of an inverted cone 4 provided (preferably) in the center of the cyclone.

Figure 4:
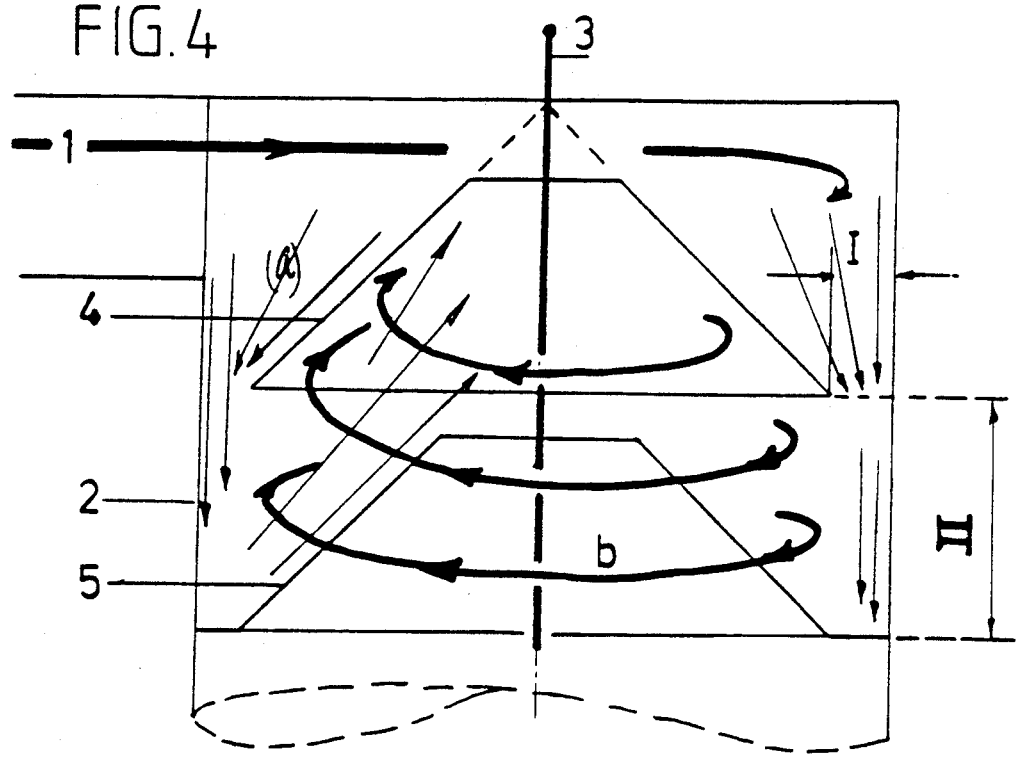
FIG. 4 is a view similar to FIG. 3 but showing the top of the cyclone illustrated in FIG. 3 and its operation in more detail.

As appears from the detail shown in FIG. 4, the centrally suspended inverted cone 4 produces initially the accelerated descending vortex (a) shown in FIG. 3. This vortex is deflected 180° from its original direction by the bottom of cone 5 and has as the only way out the cylindrical cross-section II, being substantially larger than cross-section I, in other words, besides a reversal through an angle of 180°, a sudden expansion takes place. This is highly favourable to additional vortex effects, resulting in additional mixing and enchanced chemical reactions. The cyclonic gas motion cannot become suddenly rectilinear, for a new vortex (b) is formed, as model tests have shown, which ascends according to the dotted lines shown in the drawings between the two cones at increasingly higher vertical and tangential speed = mixing speed = chemical reaction speed. The absorption/neutralizing agent is enforced to react for the second time.

Figure 5:
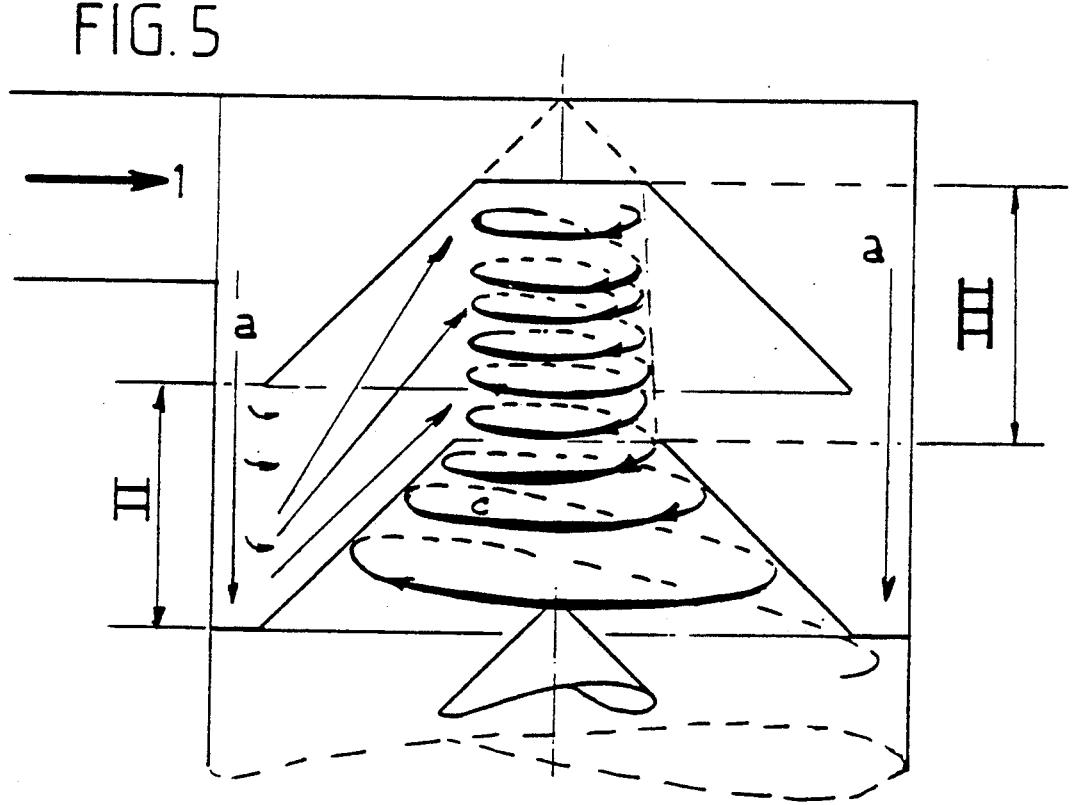
FIG. 5 is a view similar to FIG. 4, but in a further stage of the fluid motion.

FIG. 5 shows the same cyclone detail as FIG. 4 with a representation of the gas motions which are developing in a stage further than that shown in FIG. 4. From cross-section III, a substantially 180° reversal of gas motions takes place again. It should be noted that a 180° reversal, as used herein, should be construed to mean the eventual effect in a vertical sense. The actual gas motion remains tangential, resulting in a vortex ascending or descending, as a whirl, perpendicularly. In cross-section III, such a 180° reversal takes place again. Vortex (c) is formed, resulting in very high speeds, in other words, a very high mixing effect and very high chemical reaction speeds. The absorption/neutralizing agent is enforced to react for the third time, now in the second "floor".

Figure 6:
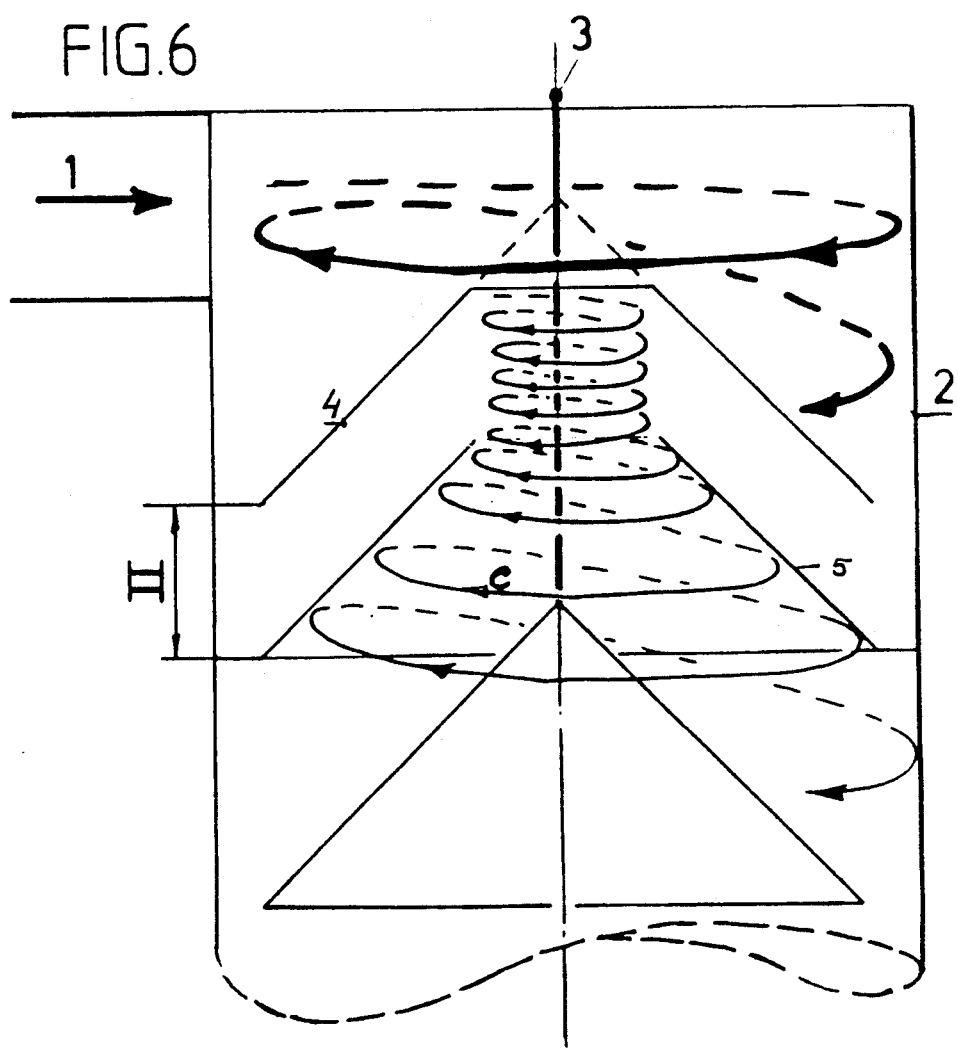
FIG. 6 is a similar view showing fluid motion subsequent to the situation shown in FIG. 5.

FIG. 6 shows the possible sequel to the situation shown in FIG. 5. By repeating this construction over various "floors", the reaction efficiency can, in fact, be increased to an unlimited extent.

Figure 7:
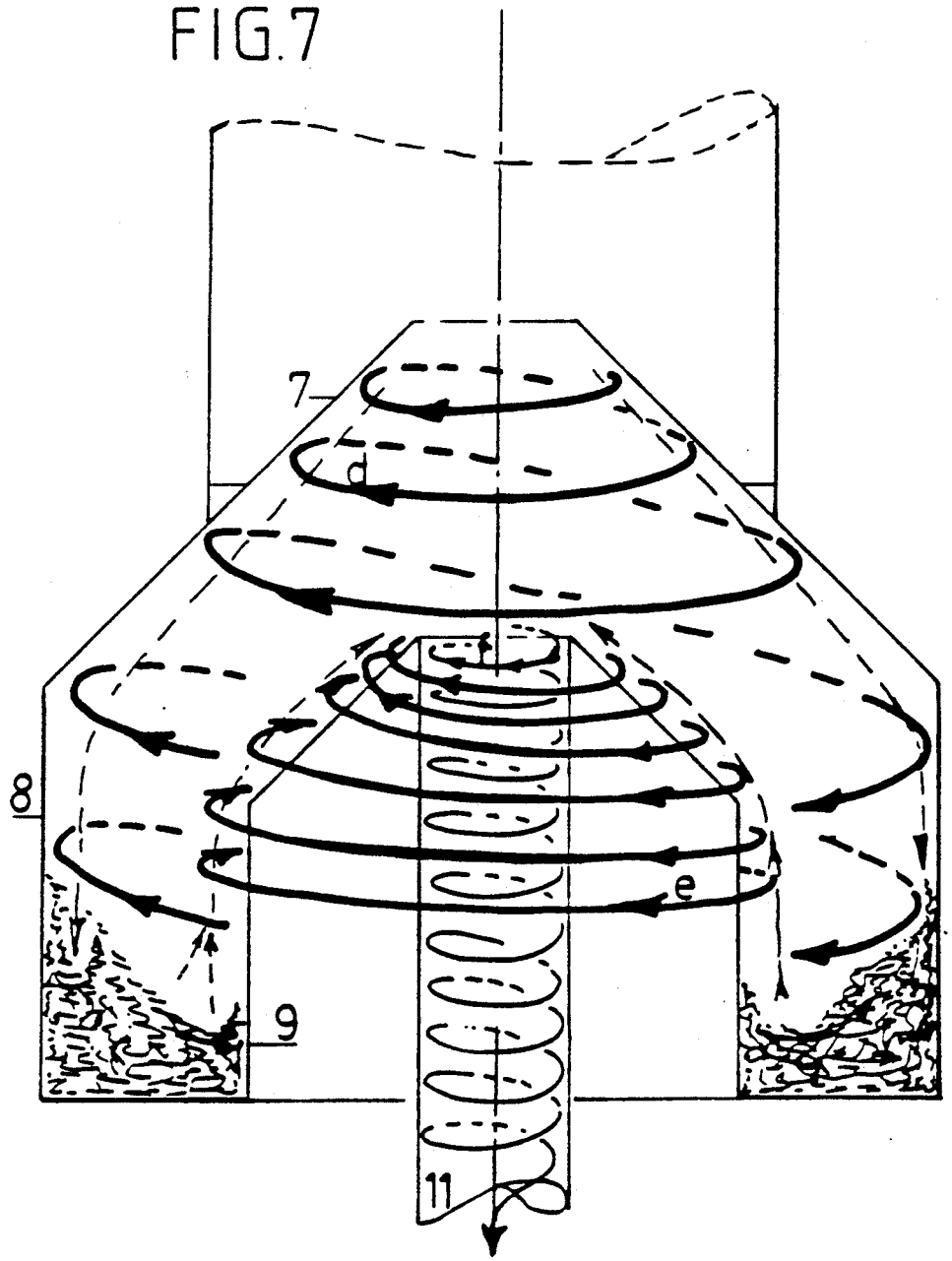
FIG. 7 shows the completion of the process by collecting reaction products.

FIG. 7 shows one of the possibilities to complete the reaction process, using the same principle according to the present invention, with the capture of reaction products. When the wall of cone 7 is extended, the speed of vortex (d) can be reduced by dimensioning of diameters so that the solid components: fly ash, chemical reaction products and any excess of neutralizing substances are deposited within cylinder 8. The vortex (d) will automatically produce vortex (e), which now ascends according to the dotted lines and thereafter discharges through the central exhaust the now strongly chemically purified gases through 11.

The increase in efficiency of the deposition of solids results in a lower load of the filters, which reduces the cost of energy and maintenance. The increase in efficiency of the chemical reactions means a saving in chemicals and residual materials, hence lower exploitation cost which, by means of the method and device according to the present invention, can even be lower than those of known installations.

It will be clear that where reference is made to flue gases and acid components, the principle of the present invention also applies to other fluids, e.g. industrial exhaust gases or liquids and basic components in which case naturally other absorption/neutralizing agents can play a role. Where the term "absorption" is used in the specification, the term "adsorption" or a similar term may be used instead.

I claim:

1. An apparatus for removing contaminants in a fluid, said fluid being selected from the group consisting of contaminated gas and liquid streams, comprising:

a cylindrical chamber (2) defined by a cylindrical wall, said cylindrical chamber having a closed top and a tangential inlet adjacent said closed top;

at least one assembly located in said cylindrical chamber providing means for imparting a whirling motion to a fluid introduced into said cylindrical chamber through said tangential inlet, said assembly comprising:

a first hollow conical insert (4) having a closed narrow top and having a wide lower edge located at a short interspace (1) from the cylindrical wall of said cylindrical chamber;

a second frusto-conical insert (5) having an open top and a wide lower end portion having a circumferential edge sealingly conected to the cylindrical wall of said cylindrical chamber, said second frutoconical insert being located underneath said first conical insert (4) such that a fluid vortex descending over said wide lower edge of said first conical insert is forced into a narrow upward path under said first conical insert before entering the open top of said second frusto-conical insert; and outlet means centrally located for delivering the fluid from said cylindrical chamber.

2. An apparatus according to claim 1, comprising a first said assembly and a second assembly, said second assembly being located underneath said first assembly.

3. An apparatus according to claim 2, further comprising a subjacent collecting space of larger diameter than said cylindrical chamber, said collecting space (8) being located below the second frusto-conical insert of said second assembly, and said diameter being of such a dimension to cause, through deceleration of the whirling mixture, the depositing of reaction products and any excess neutralizing and/or absorbing substances in said collecting space (8); said collecting space functioning as a storage space and having an exhaust means (11) extending centrally downwards through said space.

4. The apparatus according to claim 1, further comprising a conduit delivery means connected to a separating means and to a container for delivering the mixture of said fluid and said substances or the reaction products and from the container to a recirculation pipe for recirculation to an input of the cylindrical chamber or to a downstream filtering device.

* * * * *